(12) United States Patent
Hasegawa et al.

(10) Patent No.: US 6,859,598 B2
(45) Date of Patent: Feb. 22, 2005

(54) MICROSTRUCTURED OPTICAL FIBER

(75) Inventors: Takemi Hasegawa, Yokohama (JP); Eisuke Sasaoka, Yokohama (JP); Masayuki Nishimura, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/764,254

(22) Filed: Jan. 19, 2001

(65) Prior Publication Data

US 2001/0055455 A1 Dec. 27, 2001

Related U.S. Application Data

(60) Provisional application No. 60/246,714, filed on Nov. 9, 2000, provisional application No. 60/246,757, filed on Nov. 9, 2000, and provisional application No. 60/252,414, filed on Nov. 22, 2000.

(30) Foreign Application Priority Data

Jan. 21, 2000 (JP) ........................... 2000-013174
Jan. 21, 2000 (JP) ........................... 2000-013175
May 11, 2000 (JP) ........................... 2000-138738

(51) Int. Cl.$^7$ ............................. G02B 6/02; G02B 6/20
(52) U.S. Cl. ................................ 385/127; 385/125
(58) Field of Search ........................... 385/127, 121, 385/122, 123, 125, 126; 65/385

(56) References Cited

U.S. PATENT DOCUMENTS

| | | | | |
|---|---|---|---|---|
| 4,149,772 A | * | 4/1979 | Iyengar et al. | 385/127 |
| 4,691,991 A | * | 9/1987 | Unger | 385/127 |
| 4,715,679 A | * | 12/1987 | Bhagavatula | 385/127 |
| 5,448,674 A | | 9/1995 | Vengsarkar et al. | |
| 5,802,236 A | | 9/1998 | DiGiovanni et al. | |
| 5,907,652 A | * | 5/1999 | DiGiovanni et al. | |
| 5,937,127 A | * | 8/1999 | Zarian et al. | 385/128 |

FOREIGN PATENT DOCUMENTS

| | | |
|---|---|---|
| EP | 0 905 834 A2 | 3/1999 |
| EP | 1 054 273 A2 | 11/2000 |
| WO | WO 99/00685 * | 1/1999 |
| WO | WO 01/98819 A2 | 12/2001 |

OTHER PUBLICATIONS

W.J. Wadsworth et al., "Soliton effects in photonic crystal fibres at 850nm", Electronics Letters, Jan. 6, 2000, vol. 36, No. 1, pp. 53–55, XP–002145125.

"Endlessly single–mode photonic crystal fiber", T.A. Birks et al., Optics Letters, vol. 22, No. 13, Jul. 1, 1997, pp. 961–963.

* cited by examiner

*Primary Examiner*—Chandrika Prasad
(74) *Attorney, Agent, or Firm*—McDermott Will & Emery LLP

(57) ABSTRACT

In an optical fiber including a core region and cladding regions of not less than three layers which surrounds the core region in order, each of said cladding regions has a mean refractive index different from those of the adjacents regions, at least one of the cladding regions has a lower mean refractive index than both adjacent regions, and at least one cladding region is provided with a plurality of sub medium regions each having a refractive index lower than a main medium constituting this cladding region.

9 Claims, 16 Drawing Sheets

MICROSTRUCTURED OPTICAL FIBER

This application claims benefit of provisional appls 60/246,714, filed Nov. 09, 2000 and claim 60/246,757, Nov. 9, 2000 claims benefits of 60/252,414, filed Nov. 22, 2000.

BACKGROUND OF THE INVENTION

1. Field of the Invention

The present invention relates to an optical fiber which can be suitably used as an optical transmission path and a dispersion compensator.

2. Related Background Art

FIG. 22 is a cross-sectional view of an optical fiber including a so-called microstructure which has been known conventionally. As shown in FIG. 22, this optical fiber has a cross-sectional structure having a large number of voids (vacant holes) 62 in a silica glass 61. A central portion in cross section having no voids 62 constitutes a core region 63 and a portion, surrounding the core region 63, which has a large number of the voids 62 constitutes a cladding region 64.

The principle of light confinement of the optical fiber having such a microstructure is explained qualitatively using a concept called effective refractive indices (for example, T. A. Birks et al. Optics Letters Vol. 22 p.961 (1997)). Due to the existence of the microstructure, in a strict sense, the refractive indices in the core region 63 and the cladding region 64 should have a complicate distribution. However, on the assumption that the optical guide characteristics can be approximated by replacing respective regions with uniform mediums, the refractive indices of these uniform mediums are called the effective refractive indices. The effective refractive indices $n_{eff}$ satisfy a following equation.

$$\left(\frac{f_1}{n_1^2} + \frac{f_2}{n_2^2}\right)^{-1} \leq n_{eff}^2 \leq f_1 n_1^2 + f_2 n_2^2 \quad (1)$$

where n is the refractive index and f is the volume fraction. Further, a suffix 1 indicates silica glass and a suffix 2 indicates air. With respect to the volume refraction, $f_1+f_2 =1$ is established. Usually, since $n_1>n_2$, the both side members of the equation (1) become smaller corresponding to the increase of $f_2$. Accordingly, the effective refractive index of the cladding region 64 having a large number of voids 62 becomes smaller than the effective refractive index of the core region 63 so that the light confinement is realized in the same manner as in the usual optical fiber.

Such a model of the effective refractive indices is considered to be reasonable in a case that the optical wavelength is large compared to the scale of the microstructure. However, as the optical wavelength becomes shorter, the light is locally concentrated at portions having the high refractive index and hence, although the effective refractive indices are elevated, simultaneously, it is considered that the assumption that the structure having refractive index distribution can be replaced by the uniform mediums will lose the validity.

On the other hand, an optical fiber having a greater negative chromatic dispersion than such an optical fiber is disclosed in U.S. Pat. No. 5,802,236, for example. Although this optical fiber has the above-mentioned microstructure, the optical fiber is characterized in that a cladding region is constituted by an inner cladding region and an outer cladding region and the effective refractive index of the inner cladding region is smaller than the outer cladding region.

SUMMARY OF THE INVENTION

However, although the optical fiber disclosed in the above-mentioned publication increases the negative chromatic dispersion compared to the optical fiber having the uniform cladding structure, the optical fiber suffers from drawbacks such as the lowering of the effective core area, the increase of the bending loss and the increase of sensitivity to the fluctuation of the structural parameters of the effective core area.

The present invention has been made in view of the above and it is an object of the present invention to provide an optical fiber which can realize all of the large negative chromatic dispersion, the large effective core area and the small bending loss simultaneously.

To achieve such an object, according to an optical fiber of the present invention, in an optical field including a core region and cladding regions of not less than three layers which surround the core region in order, each of said cladding regions has a mean refractive index different from those of the adjacent regions, at least one of the cladding regions has lower mean refractive index than both adjacent regions, and at least one cladding region is provided with a plurality of sub medium regions each having a refractive index lower than a main medium constituting this cladding region.

Here, although the main medium must be a material which can constitute the optical fiber by itself, the sub medium may be a material which cannot constitute the optical fiber by itself such as a gas or liquid, for example.

In general, the magnitude of the negative chromatic dispersion, the magnitude of the negative chromatic dispersion slope and the magnitude of the effective core area have the trade-off relationship with the lowering of the bending loss. However, according to the present invention, it becomes possible to lower the bending loss compared to the conventional impurity-doped optical fiber. Further, provided that the bending loss is equal, the negative chromatic dispersion having the larger absolute value, the negative chromatic dispersion slope having the larger absolute value and the larger effective core area compared to a conventional impurity-doped optical fiber can be realized.

It is preferable that the core region is constituted by a substantially homogeneous medium and the cladding region is constituted by an inner cladding region of not less than two layers made of a substantially homogeneous medium and an outer cladding region which surrounds the inner cladding region and is provided with regions made of sub mediums.

The fact that a certain region is constituted by a substantially homogeneous material implies that the region does not include microstructures and it may be possible to suitably adopt a constitution where the concentration of the impurity in a material which constitutes the region is varied within the region. For example, may adopt a constitution in which the region may be constituted by silica glass containing Ge as the impurity and the concentration of Ge is gradually decreased from the center to the outer periphery.

In order to realize optical properties of optical fiber, for example chromatic dispersion, as desired, it is necessary to precisely fabricate the structures in core region and inner cladding region. Structures constituted by a substantially homogeneous material, such as silica glass, are easier to precisely fabricate than those containing regions made of sub mediums such as air. Therefore, desired optical properties are easier to realize in the optical fiber according to the present invention than in the conventional microstructured optical fibers. Moreover, induction of sub-medium regions makes it possible to lower the mean refractive index in outer cladding region to a level which is practically unachievable by a homogeneous material alone. As a result, the optical fiber according to the present invention can realize a lower bending loss than the conventional impurity-doped optical fibers can.

Further, the inner cladding region has a two-layer structure consisting of a first inner cladding and a second inner cladding and it is preferable that a following relationship holds among respective refractive indices $n_0$, $n_1$, $n_2$ of the core, the first inner cladding, the second inner cladding and a mean refractive index $n_3$ of the outer cladding region.

$$n_0 > n_2 > n_1 \text{ and } n_2 > n_3$$

By lowering the mean refractive index of the outer cladding region, it becomes possible to lower the bending loss compared to the conventional impurity-doped optical fiber. Further, with the presence of the first inner cladding region having the low refractive index, the negative chromatic dispersion having the large absolute value can be obtained. Further, since the outer cladding region in which the sub mediums are present is remote from the core region, the excess optical loss can be suppressed to a low level compared to the conventional optical fiber having microstructures.

It is preferable to arrange the sub medium in the outer cladding region as having the four-fold rotational symmetry can be substantially established with respect to the fiber axis. It is because that mode birefringence $B = (\beta_1 - \beta_2)/k$ can be made small and hence, polarization mode dispersion can be made small whereby the optical fiber can be used for transmission of optical signals of high bit rate. Here, $\beta_1$ and $\beta_2$ are the propagation coefficients of two polarization modes and k is the wave number in vacuum.

It is preferable that the main medium of the outer cladding region is made of silica and the sub mediums are gaseous or vacuum for suppressing the transmission loss to a low level.

It is preferable that the relative mean refractive index difference of the core region to the outer cladding region is set to not less than 2%.

Due to such a provision, the mean refractive index of the outer cladding region becomes relatively low and the leakage of the electromagnetic field to the outer cladding region is suppressed and hence, the bending loss at a given wavelength can be reduced.

It is preferable that the relative mean refractive index difference of the first inner cladding region relative to the second inner cladding region is set to not more than −0.1%. Due to such a constitution, the negative chromatic dispersion or the negative chromatic dispersion slope can be obtained at a given wavelength so that a suitable optical fiber can be obtained by compensating for the positive chromatic dispersion and the positive chromatic dispersion slope.

It is preferable that the ratio of the optical power which propagates through the microstructures of the outer cladding region to the total optical power propagating through said optical fiber is set to not more than 1%. This is because when the optical power which propagates through the microstructures of the outer cladding region is increased, the optical fiber becomes more vulnerable to the excess optical loss caused by impurities in the microstructures, and such a provision reduces an excess transmission loss and makes the optical fiber robust to such impurities. It is preferable to operate the optical fiber in a single mode at a given wavelength between 1510 nm to 1590 nm since the inter-mode dispersion can be eliminated and hence, it becomes possible to use the optical fiber for the transmission of the optical signal of high bit rate.

By setting the chromatic dispersion at a given wavelength between 1510 nm to 1590 nm to a value below −80 ps/nm/km. the length of the optical fiber necessary for compensating for the positive chromatic dispersion can be shortened. When the optical transmission path is constituted by combining this optical fiber and an optical fiber having the positive chromatic dispersion at a given wavelength, an optical fiber transmission path having the small cumulative chromatic dispersion and capable of performing a large capacity communication can be realized.

When the sub medium regions are arranged in a plurality of cladding regions, it is preferable to make the cross-sectional area ratio of the sub medium regions in each cladding region differs from that in each adjacent cladding region. Here, the cross-sectional area ratio is a value obtained by dividing the sum of areas which a certain medium occupies in a certain region by the area of the region. It will also be called sub medium occupying ratio. In this manner, by increasing or decreasing the cross-sectional area of the sub mediums per a unit cross-sectional area, the mean refractive index of the region including the sub medium can be determined and hence, the magnitude relationship of the mean refractive indices of respective regions can be easily determined.

In this case, for facilitating the manufacture of the optical fiber, it is preferable to make the cross-sectional areas of sub-medium regions substantially uniform in each cladding regions and different from the cross-sectional areas of sub-medium regions in each adjacent cladding region.

It is preferable that the arrangement of respective sub medium regions is substantially made equivalent to a hexagonal lattice or square lattice. By adopting the arrangement substantially equivalent to a hexagonal lattice or square lattice, a low birefringence is achieved due to rotational symmetry and a large mean refractive index difference between core and cladding regions, and hence a large chromatic dispersion are realized due to a large sub-medium occupying ratio.

It is preferable that the cladding region has a three-layer structure consisting of a first inner cladding region, a second inner cladding region and an outer cladding region and a following relationship holds among respective mean refractive indices $n_0$, $n_1$, $n_2$, $n_3$ of the core, the first inner cladding, the second inner cladding and the outer cladding region.

$$n_0 > n_2 > n_1 \text{ and } n_2 > n_3$$

Due to such a provision, the chromatic dispersion being large to negative and the chromatic dispersion slope being large to negative and the large effective core area can be realized.

DESCRIPTION OF THE PREFERRED EMBODIMENTS

Figure 1:
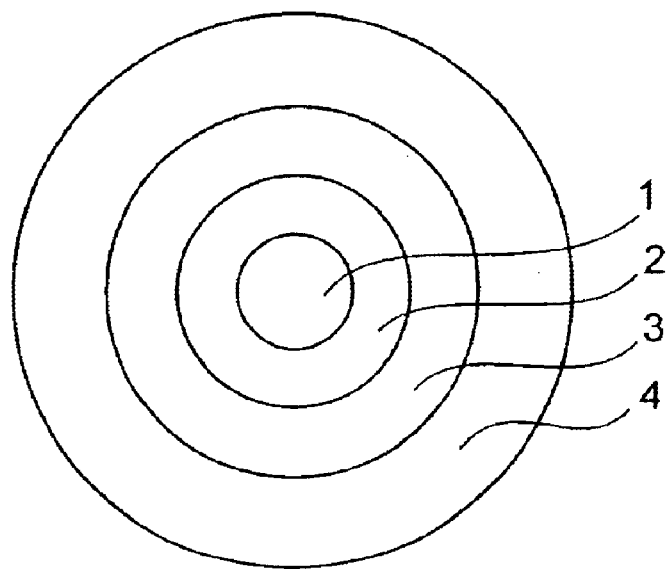
FIG. 1 is a view showing the division into regions on a cross section of an optical fiber according to a fundamental mode of the present invention.

Embodiments of the present invention are explained in conjunction with attached drawings hereinafter. To facilitate the comprehension of the explanation, the same reference numerals denote the same parts, where possible, throughout the drawings, and a repeated explanation will be omitted. Further, the size ratio of respective drawings does not necessarily agree with the size ratio of the explanation of the Mode for carrying out the Invention.

Figure 2:
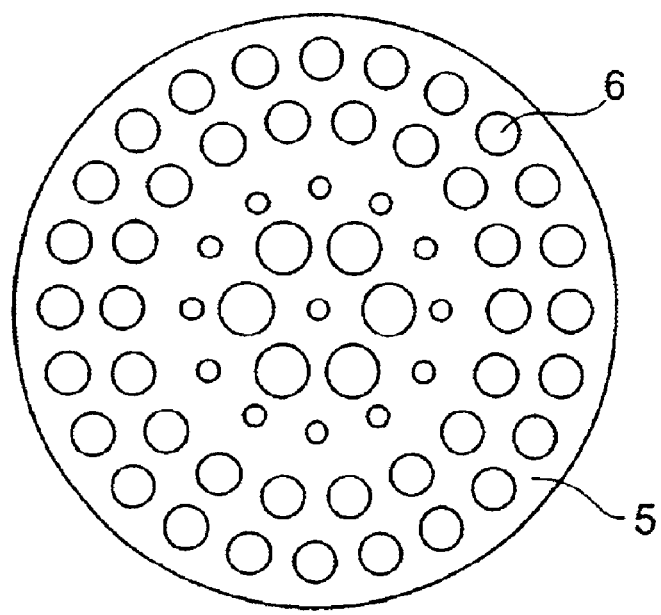
FIG. 2 is a transverse cross-sectional view showing the microstructure of the optical fiber.

FIG. 1 is a view showing the division into regions on a transverse cross section of an optical fiber of a basic mode of the present invention. FIG. 2 is a transverse cross-sectional view for explaining microstructures of the optical fiber of the embodiment. As shown in FIG. 1, in this embodiment, this optical fiber is constituted by a core region 1, a first cladding region 2 which surrounds the core region 1, and a second cladding region 3 which surrounds the first cladding region 2 and a third cladding region 4 which surrounds the second cladding region 3. Further, as shown in FIG. 2, these respective regions are comprised of silica glass 5 as a main medium and a large number of voids 6 as sub mediums.

Figure 3:
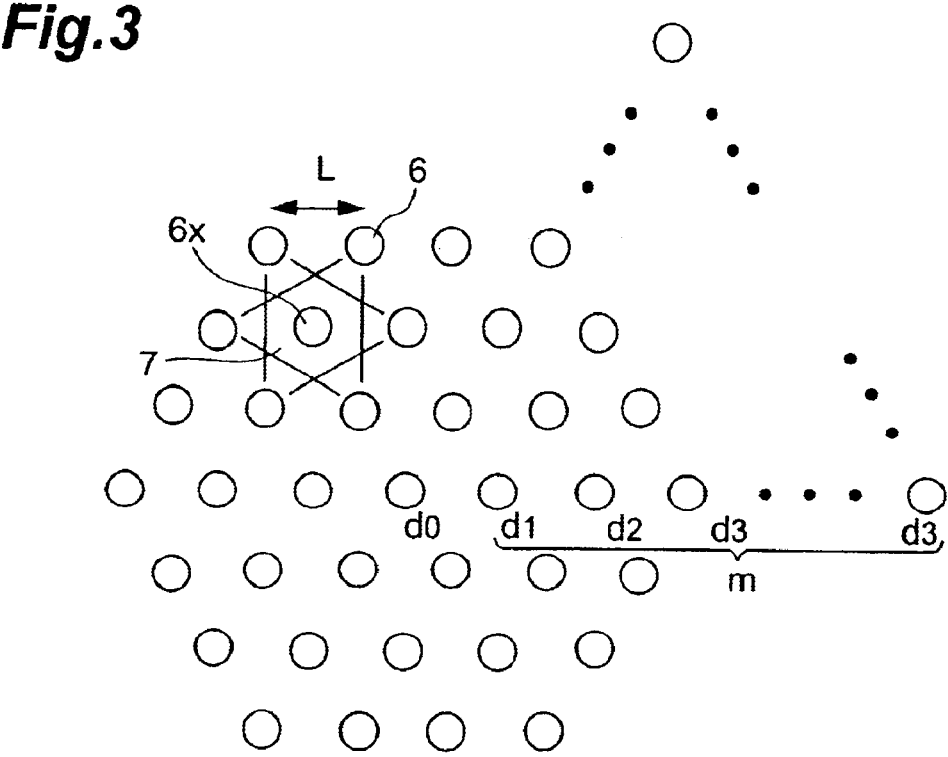
FIG. 3 is a view for explaining the definition of the mean refractive indices of the optical fiber in this specification.

In the explanation made hereinafter, a concept called the mean refractive indices is used as the refractive indices of respective regions. Since the effective refractive indices are defined using the approximation, the definition is ambiguous and hence is not suitable for the description of the structure. Accordingly, this embodiment does not employ the effective refractive indices. FIG. 3 is a view for explaining an example of a method for defining the mean refractive indices of the optical fiber of this embodiment. With respect to one void 6x focused in a certain region, perpendicular bisectors are drawn between this void 6x and other surrounding voids 6. Then, a polygon which is partitioned by these perpendicular bisectors and includes only one void 6x therein is defined. This polygon is called a cell 7. In this cell 7, the mean refractive index $n_{avg}$ can be calculated by a following equation.

$$n_{avg} = \sqrt{\frac{n_g^2(A_{cell} - A_{hole}) + n_h^2 A_{hole}}{A_{cell}}} \quad (2)$$

where, $n_g$ is the refractive index of a fiber material portion, $n_h$ is the refractive index of the void 6x portion, $A_{cell}$ is a whole area of the cell 7, and $A_{hole}$ is an area of the void 6x. The mean refractive index $n_{avg}$ of a given region can be expressed by a following equation. In the equation, the cell numbers of the cells 7 included in the region is set as j–k, a mean refractive index and the cell area of the i-th cell 7 are respectively set as $n_{avg,i}$ and $A_{cell,i}$.

$$N_{avg} = \sqrt{\frac{\sum_{i=j}^{k} n_{avg,i}^2 A_{cell,i}}{\sum_{i=j}^{k} A_{cell,i}}} \quad (3)$$

The present invention is characterized in that the relationship among the mean refractive indices of respective regions defined by the equation (3) is set to satisfy a following relationship. That is, denoting respective mean refractive indices of the core region, the first cladding region, the second cladding region, the third cladding region as $n_0$, $n_1$, $n_2$, $n_3$, a following relationship holds among them.

$n_0 > n_2 > n_1$ and $n_2 > n_3$

It is possible to set each mean refractive index $N_{avg}$ of the region by adjusting the magnitude of the voids 6. That is, by increasing or decreasing the cross-sectional area of the voids 6 per a unit cross-sectional area, the rate between the silica glass 5 as the main medium and the voids 6 as the sub medium can be increased or decreased and hence, the mean refractive index $N_{avg}$ of the region can be set to an arbitrary value.

Figure 4:
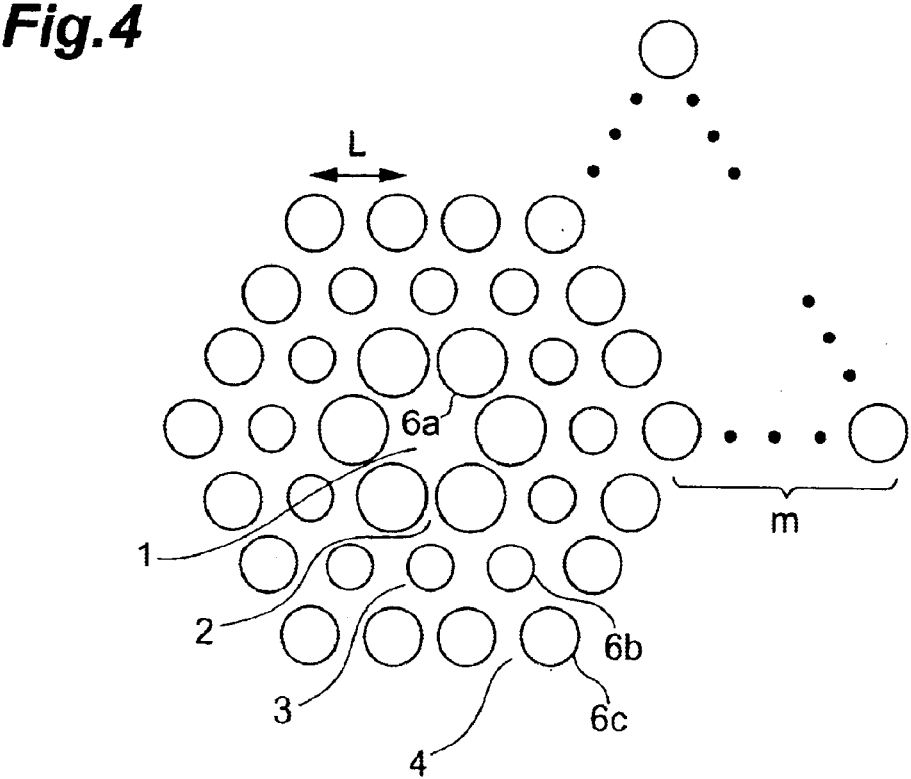
FIG. 4 and FIG. 5 are views respectively showing the cross-sectional structures of optical fibers of first and second embodiments of the present invention.
Figure 5:
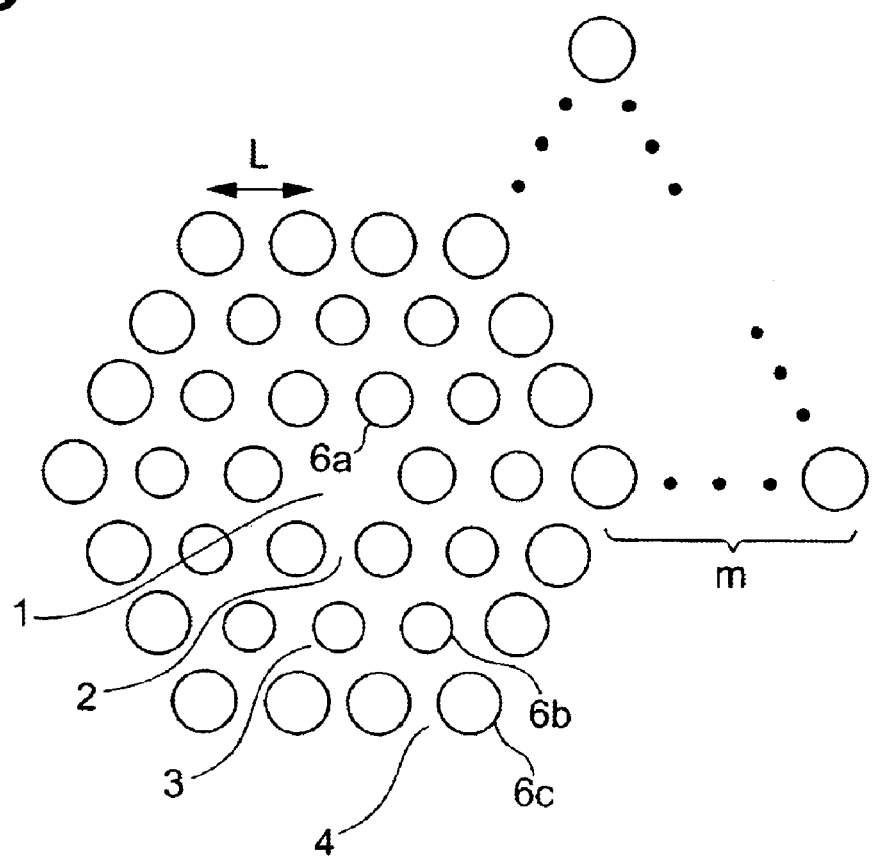

FIG. 4 and FIG. 5 are views showing respective cross-sectional structures of optical fibers of the first embodiment and the second embodiment of the present invention which have the mean refractive index distribution thereof set in the above manner.

In the optical fiber of the first embodiment shown in FIG. 4, the voids 6 are not arranged in the core region 1 and the voids 6a to 6c are respectively arranged only in the first to third cladding regions 2 to 4 in the hexagonal lattices. In the inside of respective regions, the diameter of the voids 6 is made uniform and all voids are arranged at an equal pitch L. Then, assuming the diameter of the void 6a in the first cladding region 2 as $d_1$, the diameter of the void 6b in the second cladding region 3 as $d_2$ and the diameter of the void 6c in the third cladding region 4 as $d_3$, the relationship among the diameters of the voids of respective areas is set such that $d_1 > d_3 > d_2$. As a result, as can be understood from the equations (2) (3), the relationship among the mean refractive indices of respective regions is set to satisfy the following.

$n_0 > n_2 > n_3 > n_1$

With respect to the optical fiber of the second embodiment shown in FIG. 5 also, the void 6 is not arranged in the core region 1 and the voids 6a to 6c are respectively arranged only in the first to third cladding regions 2 to 4 in a hexagonal lattice form. The second embodiment has the same constitution as that of the first embodiment on the point that the diameter of the voids 6 in each region is uniform and all voids are arranged at an equal pitch L. What differs from the first embodiment is the relationship among the diameters of the voids 6 of the respective regions. That is, in this embodiment, the relationship is set to $d_3 \geq d_1 > d_2$. As a result, as can be understood from equations (2) (3), the relationship among the mean refractive indices of respective regions satisfies the following.

$$n_0 > n_2 > n_1 \geq n_3$$

Usually, since the viscosity of the main medium is lowered at the time of drawing the fiber, the deformation of the sub-medium regions is liable to be generated and this becomes a factor which brings about the deviation of the sub-medium occupying ratio in the fiber from a desired value. Here, the manners of deformation of the sub-medium regions in the core region and the sub-medium regions in respective cladding region are substantially uniform in each region. Accordingly, when respective mean refractive indices are set such that the cross-sectional areas of the sub-medium regions in respective regions are made uniform, by adjusting the fiber drawing condition such that a certain sub-medium region has a desired occupying ratio, other sub-medium region in the same region has a desired occupying ratio whereby the fabrication of the optical fiber is facilitated.

Inventors of the present invention have prepared three kinds of optical fibers of the first or second embodiment which differ in the diameter and the pitch of the voids 6 (called examples 1 to 3) and have carried out a comparison of characteristics between these optical fibers and conventional two kinds of microstructure optical fibers (called comparison examples 1, 2). The result of the comparison is reported hereinafter.

The ratios of the diameter of the void 6 to the pitch L in the first to third cladding regions 2 to 4 in the examples and comparison examples are shown in Table 1. Here, the number of layers m of the void 6 is set to 7.

TABLE 1 ratios of diameter to pitch of voids in respective examples

|  | 1st cladding region | 2nd cladding region | 3rd cladding region |
| --- | --- | --- | --- |
| Example 1 | 0.46 | 0.38 | 0.40 |
| Example 2 | 0.40 | 0.37 | 0.40 |
| Example 3 | 0.40 | 0.34 | 0.40 |
| Comparison example 1 | 0.46 | 0.40 | 0.40 |
| Comparison example 2 | 0.40 | 0.40 | 0.40 |

Here, the example 1 is the optical fiber of the first embodiment and the examples 2 and 3 are optical fibers of the second embodiment.

Figure 6:
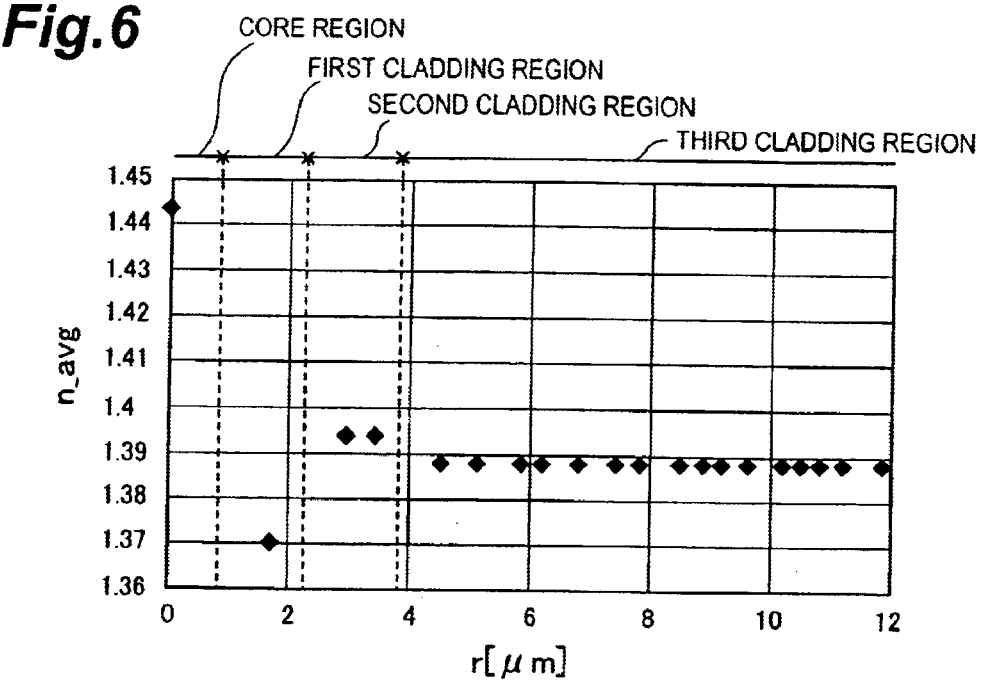
FIG. 6 and FIG. 7 are views respectively showing the distribution of the mean refractive indices of examples 1, 3.
Figure 7:
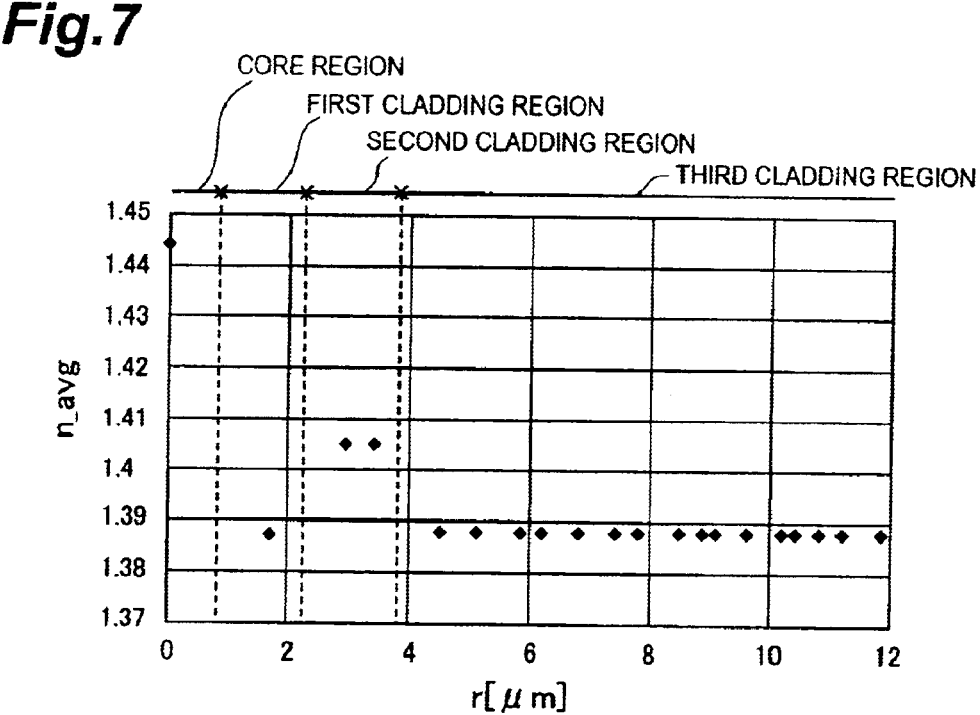

FIG. 6 and FIG. 7 are views expressed as scatter diagrams of the mean refractive indices $n_{avg}$ of respective cells relative to a distance r with respect to the first example 1 and the example 3 respectively. In these diagrams, the center P of each void 6 is set as the position of the cell 7 and the distance from an origin O (fiber axis) to P is set as r. Here, the calculation is made by setting the refractive index of silica glass 4 as 1.444 and the refractive index of air as 1.

In any one of examples, the mean refractive index in the second cladding region 3 is high since the diameter of the voids 6 is small, while the mean refractive index in the first cladding region 2 and the third cladding region 4 is low since the diameter of the voids 6 is large.

Figure 8:
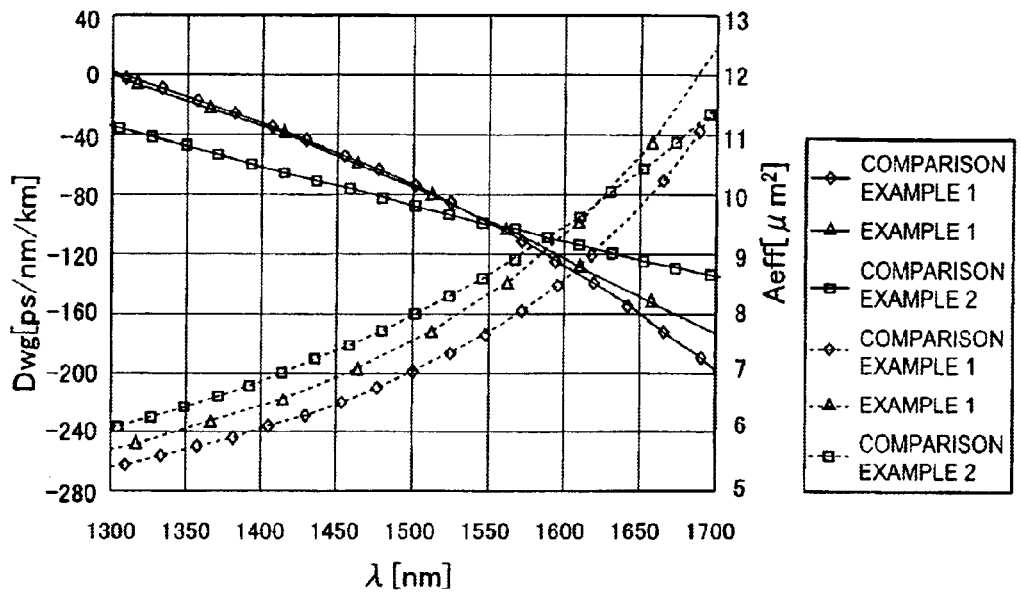
FIG. 8 is a view showing the calculated result of the waveguide dispersion and the effective core area of the example 1 and the comparison examples 1, 2 in a comparison form.

FIG. 8 shows the calculated result of the comparison between the example 1 and the comparison examples 1, 2 with respect to the structural chromatic dispersion $D_{wg}$ and the effective core area $A_{eff}$. In FIG. 8, the structural chromatic dispersion $D_{wg}$ is taken on the axis of the left-side ordinates, the effective core area $A_{eff}$ is taken on the axis of the right-side ordinates and the optical wavelength $\lambda$ is taken on the axis of abscissa. Here, in all of the example 1 and the comparison examples 1, 2, the pitches L are set such that the structural chromatic dispersion $D_{wg}$ at the wavelength of 1550 nm becomes equal −100 ps/nm/km. That is, the values of the pitches L are respectively set to 1.66 μm in the example 1, 1.62 μm in the comparison example 1 and 1.48 μm in the comparison example 2. The structural chromatic dispersion slope at the wavelength of 1550 nm is −0.5 ps/nm²/km in the example 1 and the comparison example 1 and this value is smaller than −0.2 ps/nm²/km which is the structural chromatic dispersion slope if the comparison example 2. However, in the example 1, the effective core area is set to 8.3 μm² and this value is larger than 7.7 μm² which is the effective core area of the comparison example 1.

In this manner, the optical fiber of the first embodiment can obtain the large negative chromatic dispersion. Accordingly, at the time of compensating for the dispersion of other optical fiber having the positive dispersion, the length of the optical fiber can be shortened. Further, simultaneous with the achieving of the large negative chromatic dispersion and the large negative chromatic dispersion slope, the effective core area can be increased. Accordingly, the nonlinear optical phenomena can be suppressed whereby the transmission quality can be enhanced.

Figure 9:
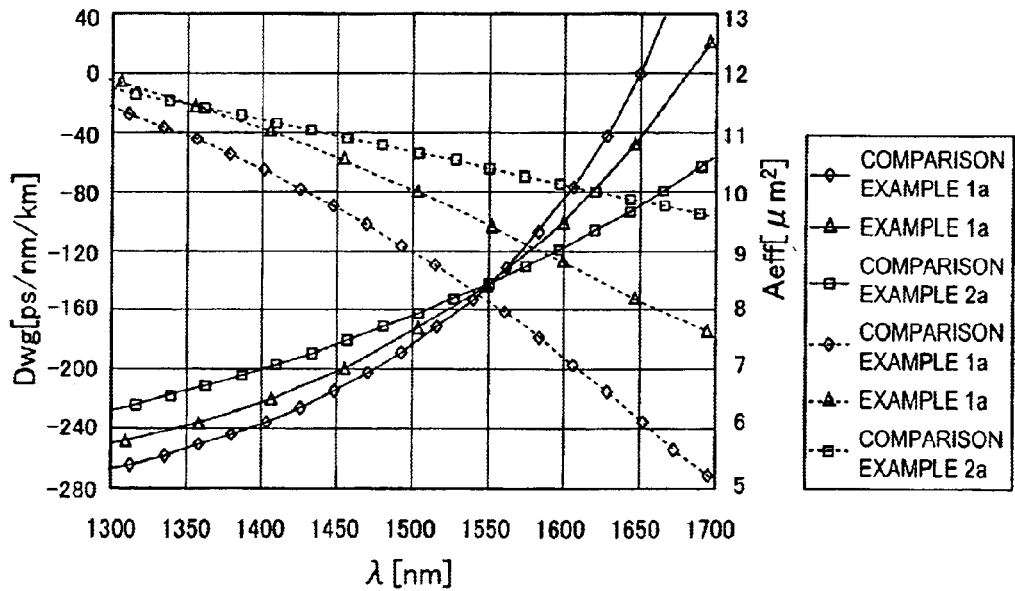
FIG. 9 is a view showing the calculated result of the waveguide dispersion and the effective core area of the example 1a and the comparison examples 1a, 2a in a comparison form.

FIG. 9 is a view showing the calculated result of the respective structural chromatic dispersions and the effective core areas at the example 1 and the comparison examples 1, 2 when the pitches are changed (a suffix a being added to classify this case from the case shown in FIG. 8 hereinafter) in a comparison form. Here, the pitches L are set such that the effective core areas $A_{eff}$ of respective optical fibers at the wavelength 1550 nm become 8.4 μm². That is, the values of the pitches L are respectively set to 1.65 μm in the example 1a, 1.54 μm in the comparison example 1a and 1.60 μm in the comparison example 2a.

Corresponding to the increase of the wavelength, the effective core areas is increased. Here, the increment pace $dA_{eff}/d\lambda$ of the effective core area $A_{eff}$ relative to the wavelength of the example 1a is smaller than that of the comparison example 1a. The fact that the increment pace of the effective core area relative to the wavelength is small in this manner implies that the light confinement to the core region is strong and the bending loss is small. Further, it also implies that the sensitivity of the effective core area to the structural parameters is low.

In this manner, since the light confinement is favorable and the bending loss is small, the effective core area can be increased. As a result, the occurrence of the nonlinear optical phenomena can be suppressed and hence, the transmission quality can be enhanced.

Figure 10:
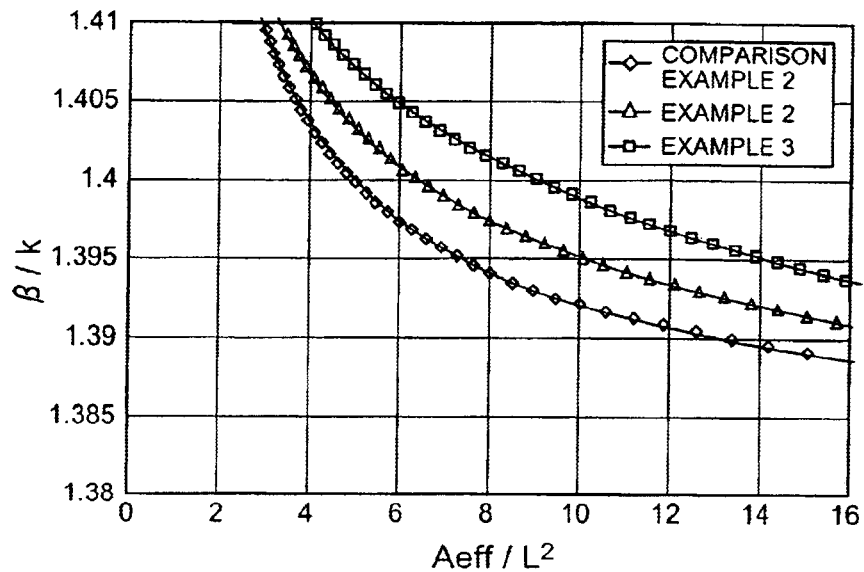
FIG. 10 and FIG. 11 are views showing the relationship between the effective core area $A_{eff}$ and the propagation coefficient $\beta$ of the comparison example 2 and the examples 2, 3 in a comparison form, wherein the effective core area $A_{eff}$ is normalized with the square value of a pitch of voids in FIG. 10 and the effective core area $A_{eff}$ is normalized by the square value of the wavelength λ in FIG. 11.

FIG. 10 shows the calculated result of the changing characteristics of the propagation coefficient β relative to the effective core area $A_{eff}$ in the examples 2, 3 and the comparison example 2 in a comparison form. The value obtained by dividing the propagation coefficient $A_{eff}$ with the wave number k is taken on the axis of ordinates and the value obtained by dividing the effective core area $A_{eff}$ with the square value of the pitch L is taken on the axis of abscissa. In general, corresponding to the increase of the effective core area $A_{eff}$, the propagation coefficient β is decreased.

Corresponding to the decrease of the propagation coefficient β, the light confinement to the core region becomes weak and the bending loss is increased. FIG. 10 shows that the example 2 exhibits the higher light confinement to the core region than the comparison example 2 thus decreasing the bending loss than the comparison example 2, while the example 3 exhibits the higher light confinement to the core region than the example 2 thus decreasing the bending loss than the example 2. Accordingly, it has been confirmed that when compared under the condition that the effective core areas $A_{eff}$ are equal, the example 2 can decrease the bending loss than the comparison example 2 and the example 3 can decrease the bending loss than the example 2. It has been also confirmed that when compared under the condition that the bending losses are equal, the example 2 can increase the effective core areas than the comparison example 2 and the example 3 can increase the effective core areas than the example 2.

Figure 11:
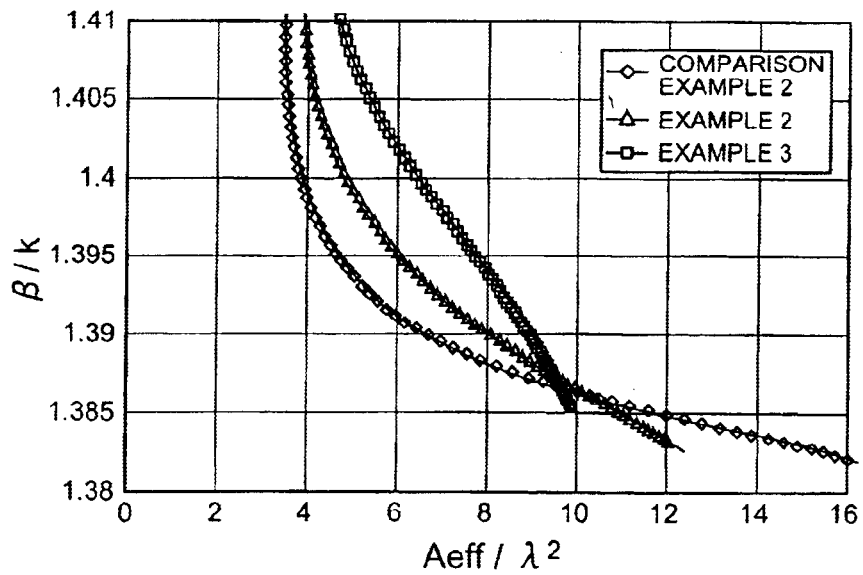

FIG. 11 is a view in which the value obtained by dividing the propagation coefficient β with the wave number k is plotted relative to the effective core area $A_{eff}$ normalized by the square of the wavelength k. In general, corresponding to the increase of the β/k, the bending loss becomes smaller. Assuming that the bending loss becomes practically sufficiently small when β/k>1.405, as can be understood from FIG. 11, with respect to the example 3, $A_{eff}/\lambda_2=5$ can be realized and the effective core area $A_{eff}=12\ \mu m^2$ can be realized at the wavelength λ=1550 nm.

Figure 12:
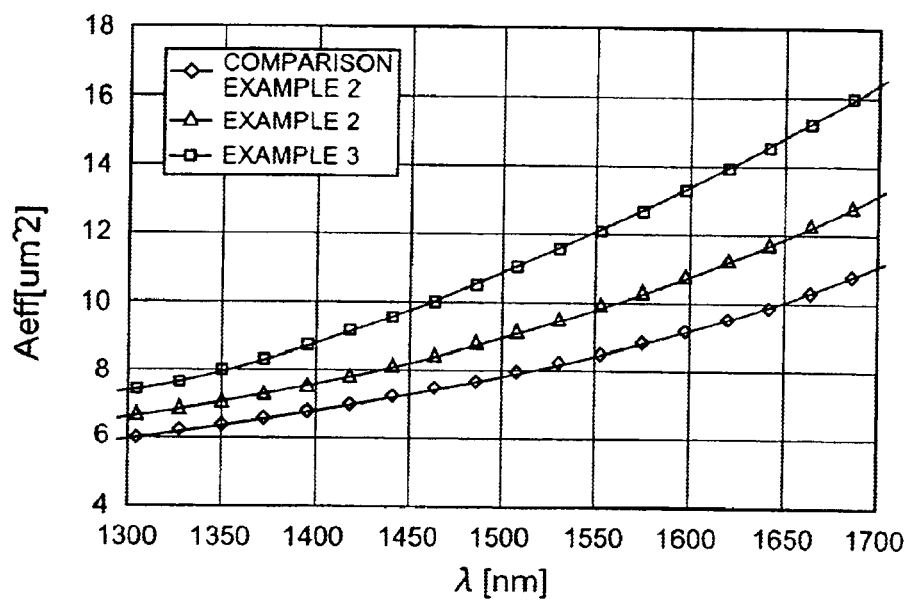
FIG. 12 and FIG. 13 are views showing the calculated result of the effective core area for the wavelength in comparison example 2 and the examples 2, 3 in a comparison form, wherein the pitch L differs between the FIG. 12 and FIG. 13.

FIG. 12 shows the calculated result of the effective core area in the examples 2, 3 and the comparison example 2 in a comparison form. Here, the calculated result is the result obtained with the pitch being set to 1.53 μm in all of the examples 2, 3 and the comparison example 2.

Focusing on the effective core area $A_{eff}$ at the wavelength λ=1550 nm, the example 2 has the larger effective core area $A_{eff}$ than the comparison example 2 and the example 3 has the greater cross-sectional area $A_{eff}$ than the example 2.

In this manner, according to the second embodiment, since the optical fiber has the large effective core area, the occurrence of the nonlinear optical phenomena can be suppressed whereby the transmission quality can be enhanced.

Figure 13:
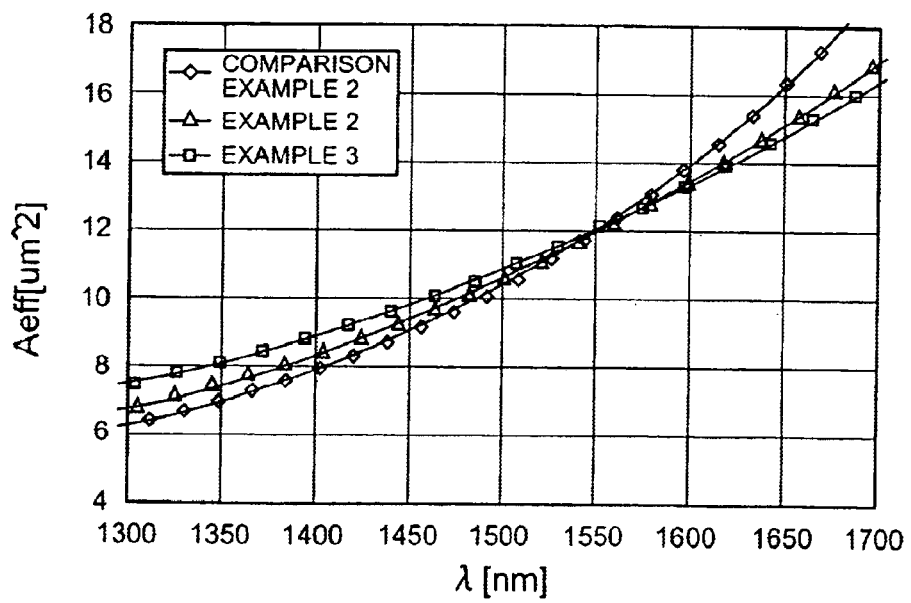

FIG. 13 is a view which shows the calculated result of the effective core area when the respective pitches L of the examples 2, 3 and the comparison example 2 are changed in a comparison form. Here, the pitches L are set such that the effective core area $A_{eff}$ at the wavelength of 1550 nm becomes 12 $\mu m^2$ in all of the examples 2, 3 and the comparison example 2. That is, the pitch values are respectively set to 1.33 μm in the example 2, 1.53 μm in the example 3 and 1.21 μm in the comparison example 2.

Focusing on the change of the effective core area $A_{eff}$ at the wavelength λ=1550 nm, with respect to the magnitude of the change of the effective core area $A_{eff}$ relative to the change of the wavelength, the example 2 has the smaller magnitude of the change of the effective core area $A_{eff}$ than the comparison example 2 and the example 3 has the smaller magnitude of the change of the effective core area $A_{eff}$ than the example 2. The fact that the magnitude of the change of the effective core area $A_{eff}$ relative to the change of the wavelength is low implies not only that the degree of the light confinement to the core region is high and the bending loss is small but also that the sensitivity of the characteristics of the effective core area $A_{eff}$ relative to the fluctuation of the structural parameters such as the pitch is small. In general, since the enlargement of the effective core area $A_{eff}$ brings about the increase of the bending loss, the fact that the bending loss obtained as the result of comparison under the same effective core area $A_{eff}$ is small implies that the large effective core area $A_{eff}$ can be realized when compared under the same bending loss.

In this manner, according to the second embodiment, since the optical fiber has the large effective core area, the occurrence of the nonlinear optical phenomena can be suppressed whereby the transmission quality can be enhanced.

As has been described heretofore, according to the optical fibers of the first and second embodiments, the optical fibers can ensure the larger effective core area compared to the conventional optical fibers and can reduce the bending loss. Further, the optical fibers can reduce the sensitivity of the effective core area to the structural parameters.

Although the mode in which the voids are arranged in a hexagonal form in the above-mentioned embodiments has been explained, the mode of arrangement is not limited to this mode and the voids may be arranged in a square form, in a staggering form or in a concentric circle form. The arrangement in the square form or in the concentric circle form is suitable for reducing the polarization mode dispersion by substantially degenerating the polarization mode.

Figure 14:
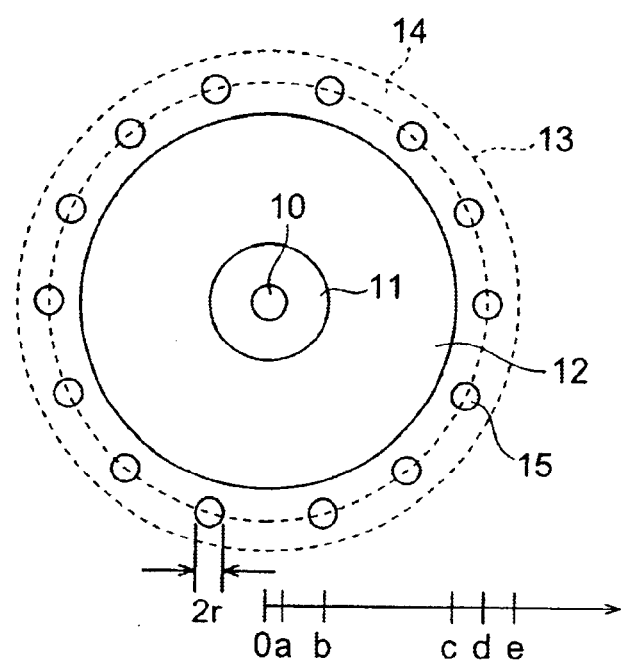
FIG. 14 is a cross-sectional view of an optical fiber of the third embodiment of the present invention.

Subsequently, the optical fiber of the third embodiment of the present invention will be explained. FIG. 14 is a cross-sectional view showing the structure of the optical fiber of this third embodiment. This optical fiber includes a core region 10, a first inner cladding region 11 which surrounds the core region 10, a second inner cladding region 12 which surrounds the first inner cladding region 11 and an outer cladding region 13 which surrounds the second inner cladding region 12. The core region 10 has a radius of a and a refractive index of $n_0$, the first inner cladding region 11 has an outer radius of b and a refractive index of $n_1$, the second inner cladding region 12 has an outer radius of c and a refractive index of $n_2$. The outer cladding region 13 is constituted by a main medium 14 having a refractive index of $n_{31}$ and sub mediums 15 having a refractive index of $n_{32}$. Small regions of the sub-mediums 15 are circles having a radius of r. These circles being N in number are equidistantly arranged on a circumference of a circle having a radius d about a fiber axis which becomes the center. In such an arrangement, a four-fold rotational symmetry substantially holds with respect to the fiber axis. Further, an outer region around a circumference having a radius e which satisfies e>d+r has the refractive index $n_{31}$ which is uniform. This region is made of a material such as glass or polymer and constitutes a region which enhances the mechanical strength but gives no influence to the optical characteristics. This region is called "a jacket region" hereinafter.

In the optical fiber according to this embodiment, the values of respective parameters are as follows. That is, a=1.37 μm, b=4.9 μm, c=14.7 μm, d=17.8 μm, e=20.9 μm, $n_2=n_{31}=1.444$ (pure silica glass), $\Delta_0=(n_0^2-n_2^2)/(n_0^2+n_2^2)=+1.49\%$ (silica glass doped with 14.5 mol % of $GeO_2$), $\Delta_1=(n_1^2-n_2^2)/(n_1^2+n_2^2)=-0.36\%$ (silica based glass doped with 1.113 wt % of F), $n_{32}=1.0$ (void), N=18.

That is, $n_0>n_2>n_1$ is established and the mean refractive index $n_3$ of the outer cladding region 13 can be made lower than the refractive index $n_2$ of the second inner cladding region 12 by arranging the voids and hence, $n_2>n_3$ is established.

In this embodiment, since the medium which constitutes the second inner cladding region and the jacket region and the main medium of the outer cladding region is equal (pure silica), the inner radius c and the outer radius e of the outer cladding region can be arbitrarily determined. Here, the inner radius c and the outer radius e are selected such that the thickness of the outer cladding region 13 ((e−c)=6.2 μm) becomes approximately equal to the distance (2πd/N=6.2 μm) between neighboring voids in the outer cladding region 13 and d=(c+e)/2.

Using the above-mentioned respective parameters as common parameters, a simulation on the propagation characteristics has been performed with respect to three examples (examples 4 to 6) which differ in the diameter of the sub mediums (voids) 15 and a comparison example 3 which has no void. The radius of voids of the examples 4, 5, 6 are respectively set to 0.363 μm, 0.722 μm and 1.431 μm.

Here, the mean refractive index $n_{avg}$ of the outer cladding region 13 at the wavelength of λ=1550 nm is set to 1.440 in the example 4, 1.428 in the example 5 and 1.380 in the example 6. The relative mean refractive index difference of the first inner cladding region 11 to the outer cladding region 13 ($\Delta_{03}=(n_0^2-n_{avg}^2)/(n_0^2+n_{avg}^2)$) is set to 1.77% in the example 4, 2.61% in the example 5 and 6.04% in the example 6.

Figure 15:
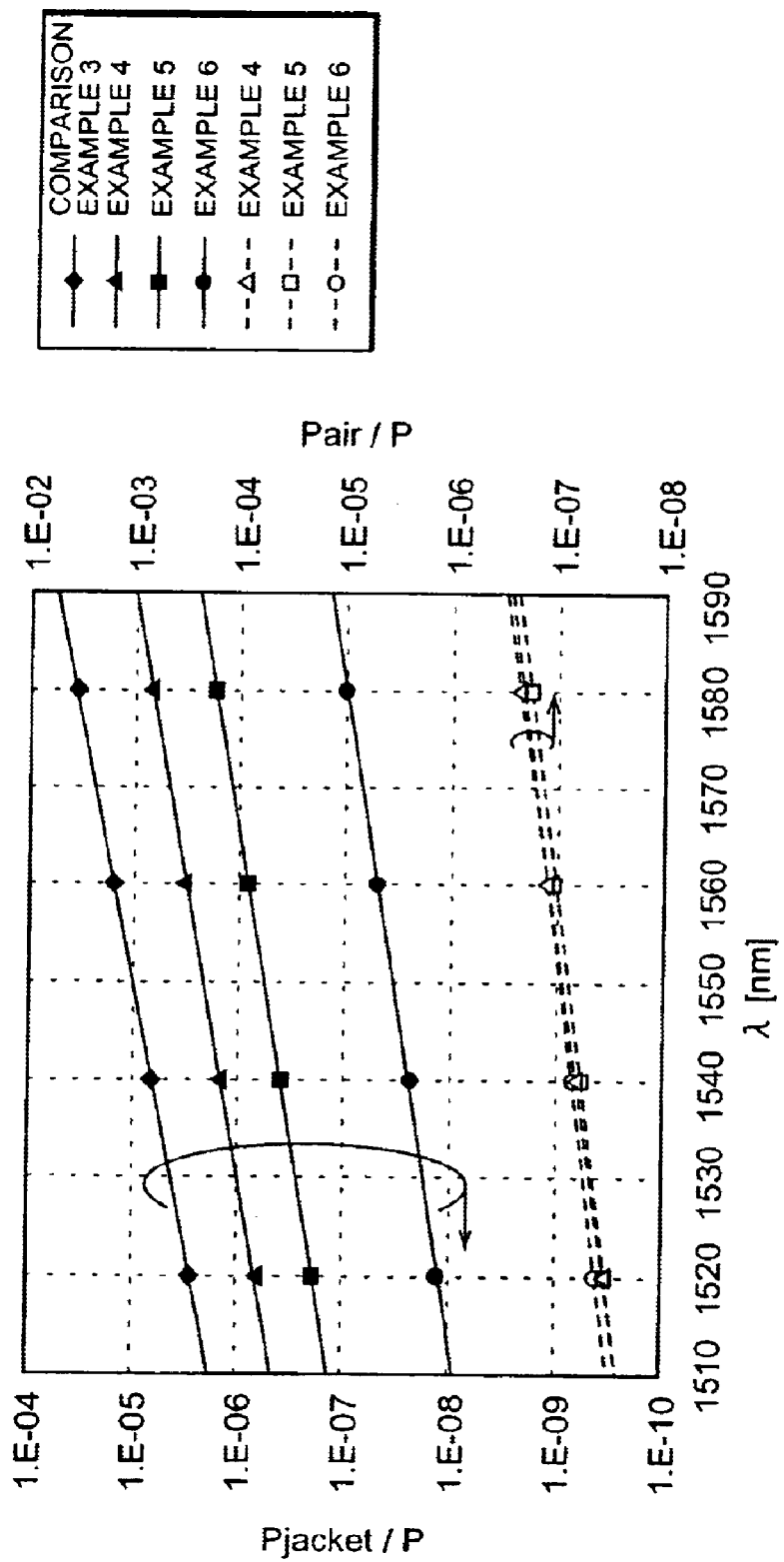
FIG. 15 is a graph showing the ratio of optical power which propagates through a jacket region $P_{jacket}/P$ and the ratio of optical power which propagates through void $P_{air}/P$ in the comparison example 3 and examples 4–6 in a comparison form.

FIG. 15 is a graph showing the ratio of optical power which propagates through a jacket region to the total optical power propagating through said optical fiber ($P_{jacket}/P$) and the ratio of optical power which propagates through void to the total optical power propagating through said optical fiber ($P_{air}/P$) in the comparison example 3 and examples 4 to 6 in a comparison form.

In the examples 4 to 6, by introducing voids as the sub mediums 15 into the outer cladding region 13, the ratio of optical power which propagates through a jacket region to the total optical power propagating through said optical fiber ($P_{jacket}/P$) is reduced compared to the comparison example 3.

On the other hand, this ration of optical power which propagates through a jacket region to the total optical power propagating through said optical fiber ($P_{jacket}/P$) has the positive correlation with the bending loss. Accordingly, by introducing voids into the outer cladding region 13, an advantageous effect that the bending loss is reduced can be obtained. Accordingly, a highly reliable transmission path having low transmission loss can be realized.

Figure 16:
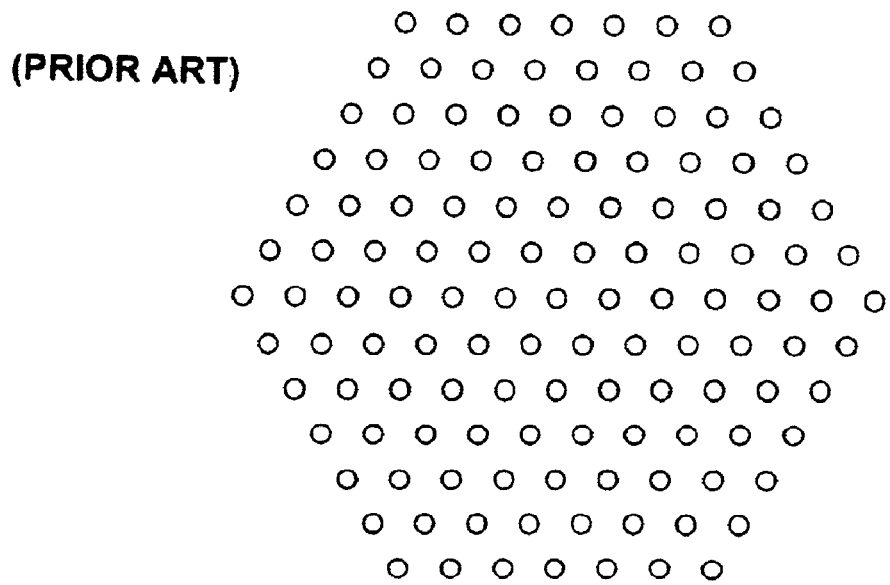
FIG. 16 is a cross-sectional view of a conventional optical fiber having microstructures.

Further, the ratio of optical power which propagates through void to the total optical power propagating through said optical fiber ($P_{air}/P$) is set to not more than $10^{-6}$. This contrasts remarkably with the fact that the conventional optical fiber having microstructures has the large ratio of optical power which propagates through void to the total optical power propagating through said optical fiber ($P_{air}/P$). For example, as shown in FIG. 16, in the conventional optical fiber having microstructures where voids having a diameter of 0.68 μm are arranged in silica glass at a pitch of 1.7 μm, the ratio of optical power which propagates through void to the total optical power propagating through said optical fiber ($P_{air}/P$) at the wavelength of λ=1550 nm is 0.039 which is $10^4$ times larger than that of the optical fiber of this embodiment. This large ratio of optical power which propagates through void to the total optical power propagating through said optical fiber ($P_{air}/P$) has been the factor for generating an excess optical loss. To the contrary, in the optical fiber according to this embodiment, since the ratio of optical power which propagates through void to the total optical power propagating through said optical fiber is small, the possibility that the excess optical loss is generated can be reduced and the sensitivity of the chromatic dispersion characteristics to the shape of voids can be also reduced whereby the demand for the fabrication technique can be alleviated.

Figure 17:
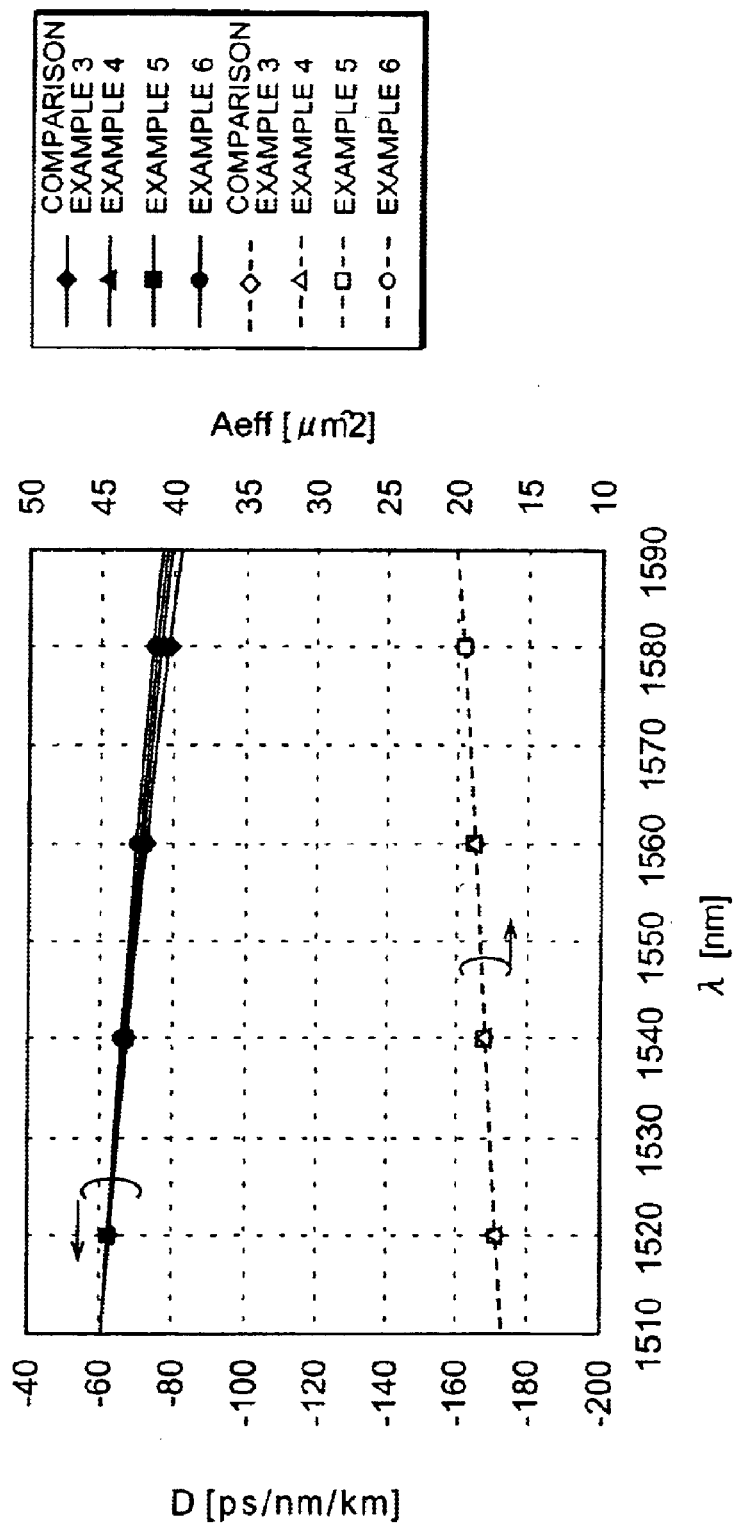
FIG. 17 is a view showing the calculated result of the chromatic dispersion and the effective core area of examples 4–6 and a comparison example 3 in a comparison form.

FIG. 17 is a view showing the calculated result of the structural chromatic dispersion and the effective core area of examples 4 to 6 and a comparison example 3 in a comparison form. In FIG. 17, the structural chromatic dispersion D is taken on the axis of the left-side ordinates, the effective core area $A_{eff}$ is taken on the axis of the right-side ordinates and the optical wavelength λ is taken on the axis of abscissa. As shown in FIG. 17, it is understood that even when the voids are introduced into the outer cladding region 13, no substantial change is recognized with respect to the structural chromatic dispersion D and the effective core area $A_{eff}$.

Accordingly, the optical fiber of the third embodiment can reduce the sensitivity of the structural chromatic dispersion to the shape of the voids. Further, with the introduction of the voids, the bending loss can be reduced. In general, when the chromatic dispersion is displaced from a given value, the deterioration of the transmission quality caused by the residual dispersion in the transmission path occurs and hence, the high fabrication accuracy is required with respect to the chromatic dispersion. On the other hand, the bending loss is only required to be lower than a given threshold value, no high fabrication accuracy is required with respect to the bending loss. In the optical fiber of this embodiment, although the bending loss depends on the shape of voids, the chromatic dispersion does not depend on the shape of voids and hence, the demand for the fabrication technique with respect to the accuracy of the shape of voids can be alleviated.

In any one of examples 4 to 6, as in the case of the comparison example 3, the optical fibers are operated under a single mode at the wavelength of λ=1550 nm. Accordingly, there is no multimode dispersion and hence, the optical communication of a high pitch rate can be realized. Further, since the arrangement of the voids substantially has the four-fold rotational symmetry with respect to the fiber axis, the mode birefringence B at the wavelength of λ=1550 nm becomes $1.5 \times 10^{-7}$ in the example 4, $1.5 \times 10^{-7}$ in the example 5 and $1.5 \times 10^{-7}$ in the example 6 and these values are similar to or rather less than $1.7 \times 10^{-7}$ of the comparison example 3 and hence can be ignored. Since the mode birefringence is small, the polarization mode dispersion becomes small whereby the optical communication of a high bit rate can be realized.

Figure 18:
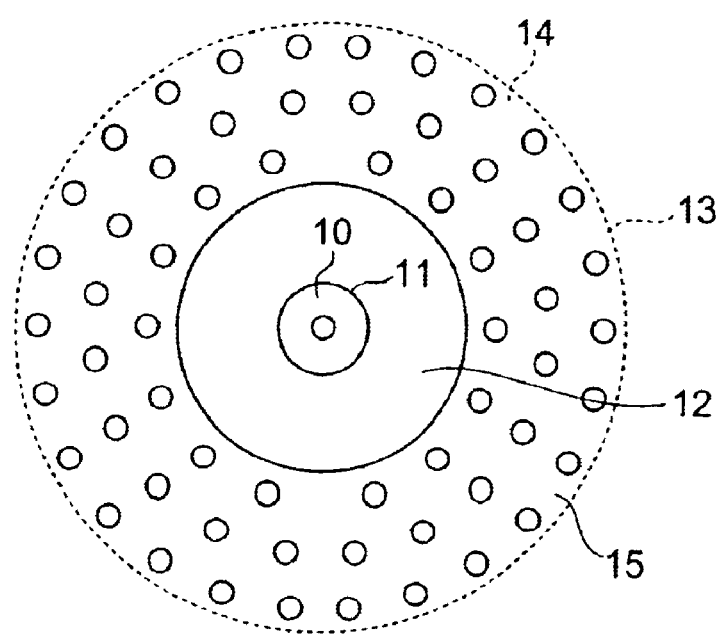
FIG. 18 is a cross-sectional view showing a modification of the third embodiment.

In the above explanation, a case in which the small regions (voids) of the sub mediums 15 in the outer cladding region 13 are arranged on the circumference of one circle having its center at the fiber axis has been explained. However, the present invention is not limited to this and may adopt other constitutions. That is, as shown in FIG. 18, the small regions may be arranged on circumferences of a plurality of concentric circles having their centers at the fiber axis. In this manner, by arranging the small regions of sub mediums on the circumferences of a plurality of concentric circles, the thickness (e–c) of the outer cladding region 13 can be increased.

With the introduction of the voids as the sub mediums 15 to the outer cladding region 13, the optical power $P_{jacket}/P$ which leaks to the jacket is reduced and hence, an advantageous effect that the bending loss is reduced can be obtained. In addition to the above, by increasing the thickness of the outer cladding region 13, an advantageous effect that the optical power which leaks through the outer cladding region 13 is also reduced can be obtained. Accordingly, the optical fiber can further reduce the bending loss.

Subsequently, the result obtained by comparing the characteristics of optical fibers examples 6a, 6b which respectively reduce only the radius of a of the core region 10 of the example 6 to 1.29 μm and 1.27 μm, the characteristics of the example 6 and the characteristics of the comparison example 3 is explained.

Figure 19:
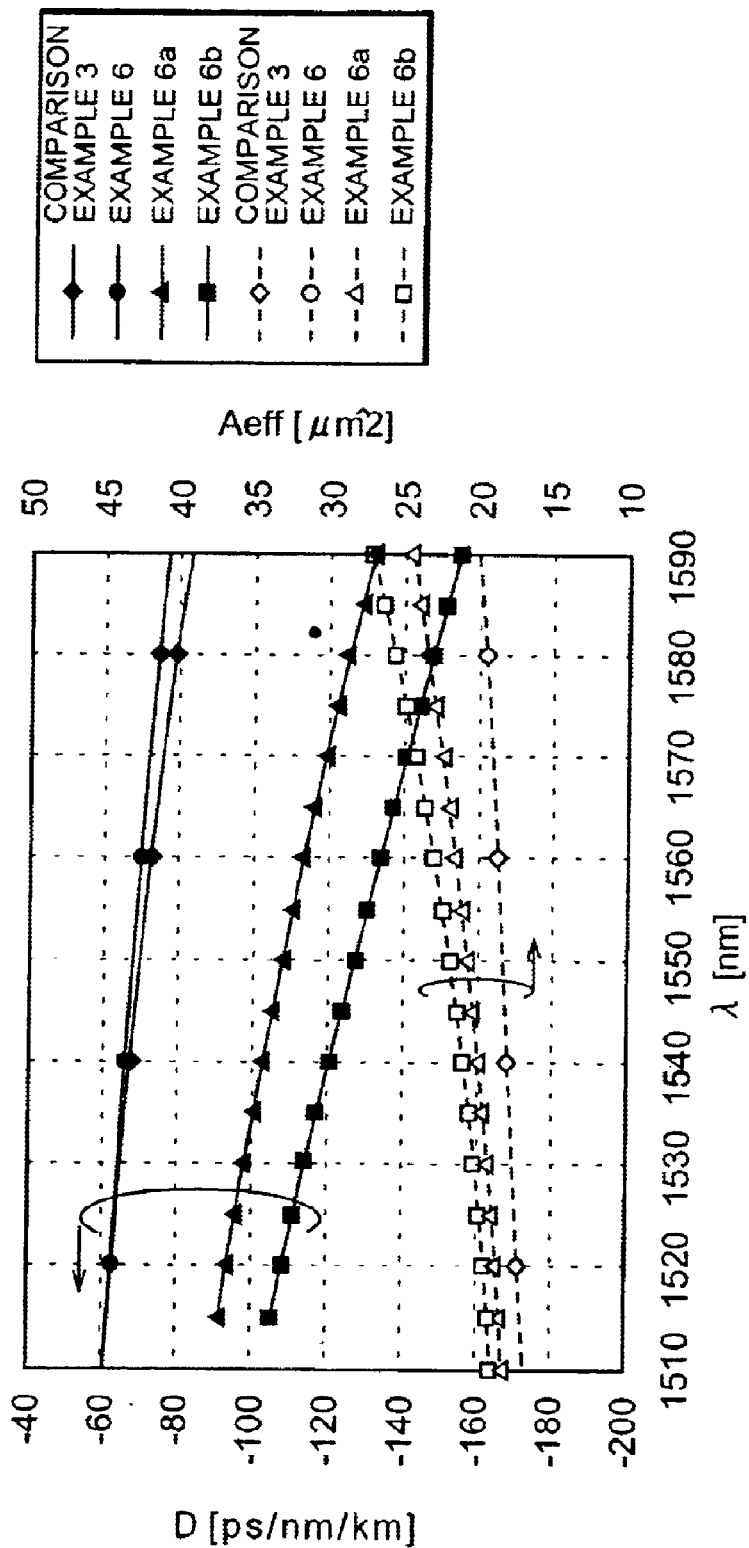
FIG. 19 is a view showing the change of the chromatic dispersion D and the effective core area $A_{eff}$ to wavelength in examples 6, 6a, 6b and the comparison example 3 in a comparison form.

FIG. 19 is a view showing the change of the chromatic dispersion D and the effective core area $A_{eff}$ to respective wavelengths in examples 6, 6a, 6b and the comparison example 3 in a comparison form. As can be understood from FIG. 19, the examples 6a, 6b have the larger chromatic dispersions D to negative than the comparison example 3 and the example 6, have the large chromatic dispersion slope S to negative, and have the large effective core areas $A_{eff}$.

To review the values of the chromatic dispersion D at the wavelength of λ=1550 nm, the chromatic dispersion D is set to –69 ps/nm/km in the comparison example 3, –67 ps/nm/km in the example 6, –108 ps/nm/km in the example 6a and −127 ps/nm/km in the example 6b. The chromatic dispersion slope S is set to −0.25 ps/nm²/km in the comparison example 3, −0.20 ps/nm²/km in the example 6, −0.53 ps/nm²/km in the example 6a and −67 ps/nm²/km in the example 6b. The effective core areas $A_{eff}$ is set to 18 $\mu$m² in the comparison example 3 and the example 6, 21 $\mu$m² in the example 6a and 22 $\mu$m² in the example 6b. That is, the example 6a, 6b can have the larger chromatic dispersion to negative, the larger dispersion slope to negative and the larger effective core area compared with the comparison example 3 and the example 6.

Figure 20:
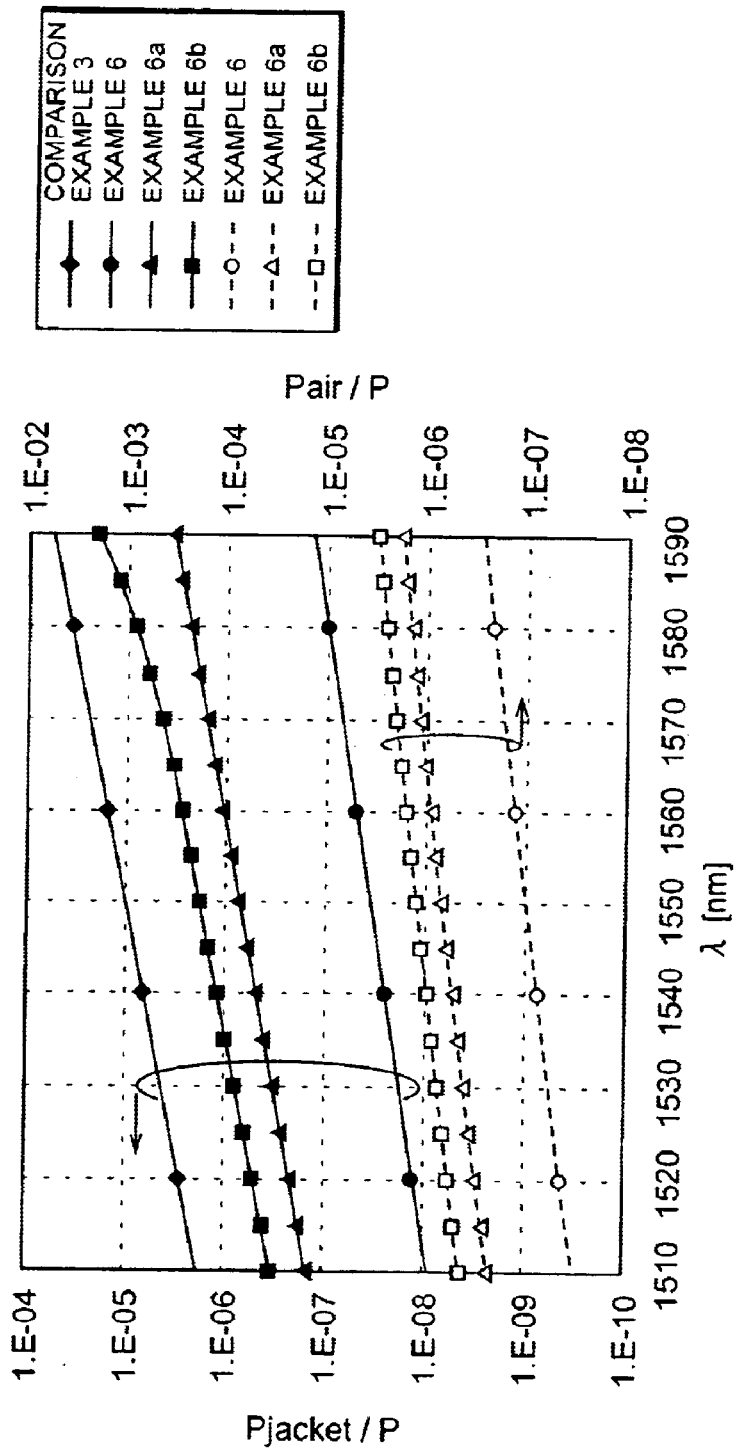
FIG. 20 is a view showing the ratio of optical power which propagates through a jacket region $P_{jacket}/P$ and the ratio of optical power which propagates through void $P_{air}/P$ in the comparison example 3 and examples 6, 6a, 6b in a comparison form.

FIG. 20 is a view showing the ratio of optical power which propagates through a jacket region to the total optical power propagating through said optical fiber ($P_{jacket}/P$) and the ratio of optical power which propagates through void to the total optical power propagating through said optical fiber ($P_{air}/P$) in the comparison example 3 and examples 6, 6a, 6b in a comparison form. Although the examples 6a, 6b exhibit the larger ratio of optical power which propagates through a jacket region to the total optical power propagating through said optical fiber ($P_{jacket}/P$) than the example 6, the examples 6a, 6b exhibit the smaller ratio of optical power which propagates through a jacket region to the total optical power propagating through said optical fiber ($P_{jacket}/P$) than the comparison example 3. That is, the examples 6a, 6b can simultaneously achieve the large chromatic dispersion to negative, the large chromatic dispersion slope to negative, the large effective core area and the small bending loss compared with the comparison example 3.

Further, in any one of these structures, the optical fiber is operated in a single mode at the wavelength of $\lambda$=1550 nm. Further, the mode birefringence B is set to $1.2 \times 10^{-6}$ in the example 6a and to $2.9 \times 10^{-6}$ in the example 6b and hence, the mode birefringence B can be ignored.

Accordingly, in the optical fiber according to this embodiment, the bending loss is reduced by introducing the voids into the outer cladding region 13 and, at the same time, the structure of the inner region is selected such that the increase of the negative chromatic dispersion, the negative chromatic dispersion slope and the effective core area which exceeds the lowering range of the bending loss can be obtained. As a result, compared with the conventional impurity-doped optical fiber which constitutes the outer cladding region 13 by the homogeneous medium, the optical fiber of this embodiment can realize the low bending loss, the large negative chromatic dispersion, the large negative chromatic dispersion slope and the large effective core area simultaneously. The fact that the negative chromatic dispersion and the negative chromatic dispersion slope are large implies that the length of the fiber for compensating for the positive chromatic dispersion and the positive chromatic dispersion slope can be shortened and the fact that the effective core area is large implies that the deterioration of the transmission quality caused by the nonlinear optical effect is small.

Figure 21:
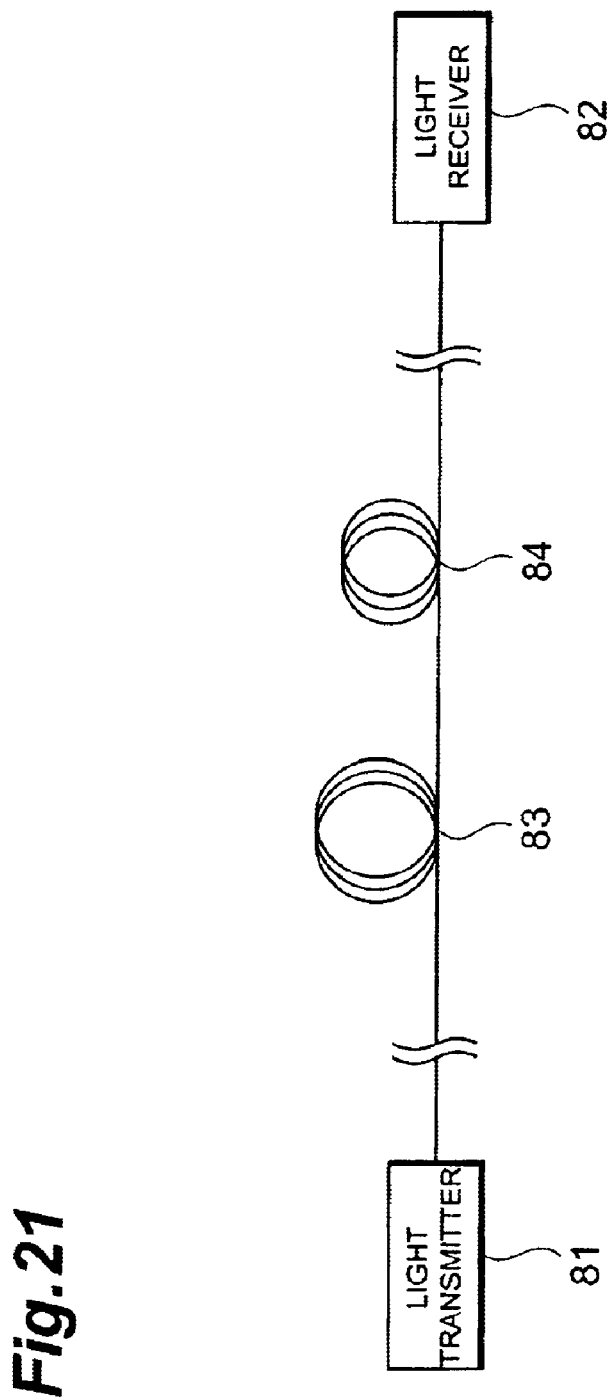
FIG. 21 is a view showing an optical transmission path which adopts the optical fiber of the present invention.
Figure 22:
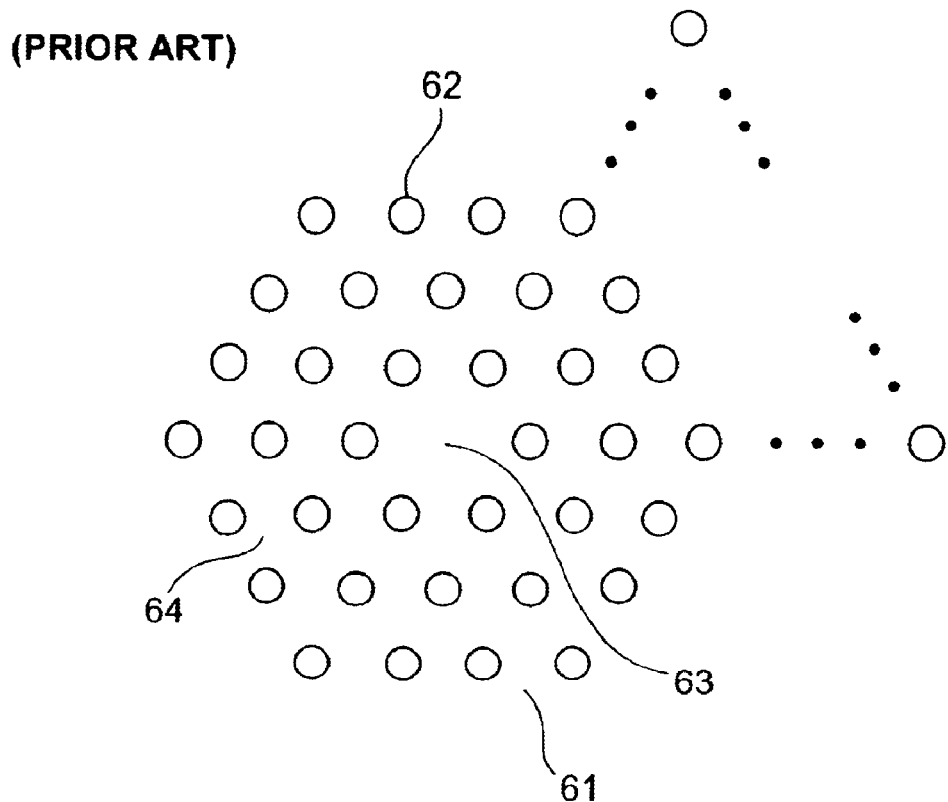
FIG. 22 is a cross-sectional view of an optical fiber including microstructures which has been known conventionally.

Since the optical fiber of the above-mentioned embodiment has the large dispersion to negative and the large effective core area, when the optical fiber is combined with an optical fiber having the positive dispersion, an optical transmission path having a large communication capacity can be made. An example of an optical transmission path shown in FIG. 21 is comprised of a light transmitter 81, a light receiver 82, a positive dispersion optical fiber 83 and a negative chromatic dispersion optical fiber 84 according to the above-mentioned embodiment. In general, in an optical transmission path which is formed by combining a positive dispersion optical fiber and a negative chromatic dispersion optical fiber, the deterioration of the transmission quality caused by the nonlinear optical effect in the negative chromatic dispersion optical fiber becomes a problem and the influence of the nonlinear optical effect is increased corresponding to the increase of the effective core area and the fiber length of the negative chromatic dispersion optical fiber. However, the negative chromatic dispersion optical fiber according to the present invention has the large effective core area and the negative chromatic dispersion of the large absolute value so that the length of the optical fiber necessary for the dispersion compensation can be shortened. Accordingly, the influence of the nonlinear optical effect can be reduced so that an optical transmission path with the least deterioration of the transmission quality can be realized.

According to the present invention, a material such as air or liquid which cannot be used alone as a material of the outer cladding region can be used as the sub medium of the outer cladding region. By selecting the refractive index of the sub medium such that the refractive index of the sub medium becomes lower than the refractive index of the main medium, it becomes possible to reduce the mean refractive index of the outer cladding region compared with a case that the outer cladding region is made of only the main medium.

As a result, it becomes possible to reduce the bending loss compared with the conventional impurity-doped optical fiber. On the other hand, the magnitude of the negative chromatic dispersion, the magnitude of the negative chromatic dispersion slope and the magnitude of the effective core area have the trade-off relationship with the lowering of the bending loss. Accordingly, when the optical fiber of the present invention and the conventional impurity-doped optical fiber are compared under a condition that their bending losses are equal, the optical fiber of the present invention can realize the negative chromatic dispersion of larger absolute value, the negative chromatic dispersion slope of larger absolute value and the larger effective core area compared with the conventional impurity-doped optical fiber. The fact that the absolute values of the negative chromatic dispersion and the negative chromatic dispersion slope are large implies that the fiber length necessary for compensating for the positive dispersion and the positive dispersion slope in the transmission path can be shortened. Further, since the optical fiber of the present invention has the large effective core area, the deterioration of the transmission characteristics caused by the nonlinear optical effect can be suppressed. Further, since the bending loss is small, the optical fiber according to the present invention is applicable to a miniaturized dispersion compensation module and the reliability of the optical fiber when used as an optical transmission path can be enhanced.

Further, the optical fiber according to the present invention can obtain the negative chromatic dispersion of the larger absolute value compared with the conventional air-cladding optical fiber. This is because that the first inner cladding region which has the refractive index lower than the refractive indices of both of the core region and the second inner cladding region is present in the optical fiber.

Further, according to the present invention, the excess optical loss can be suppressed compared to the conventional microstructure optical fiber. This is because that the region where the sub mediums are present is disposed away from the core region. It is considered that the excess optical loss is generated due to the sub mediums such as voids. However, according to the optical fiber of the present invention, since the first inner cladding region and the second inner cladding region are present between the outer cladding region in which the sub mediums are included and the core region to which the optical power is concentrated, the ratio of the optical power which propagates through the sub mediums and an interface between the sub mediums and the main medium is smaller compared to the conventional microstructure optical fiber. As a result, the optical loss caused by the sub mediums can be made small.

Further, according to optical fiber of the present invention, when the voids are used as the small regions made of sub mediums, the optical fiber can be fabricated much easier than the conventional optical fiber having microstructures. Two reasons are considered. The first reason is that the sensitivity of chromatic dispersion characteristics to the shape of the small regions made of sub mediums can be reduced due to such a constitution. In the optical fiber of the present invention, the first inner cladding region and the second inner cladding region are present between the sub mediums (for example, voids) introduced into the outer cladding region and the core region. Accordingly, the chromatic dispersion is controlled by the core region, the first inner cladding region and the second inner cladding region disposed in the vicinity of the core region and the influence that the outer cladding region gives to the chromatic dispersion characteristics can be ignored. Accordingly, the demand for the accuracy of the shape of small regions made of sub mediums is alleviated and hence, the optical fiber can be fabricated easier compared with the conventional optical fiber having microstructures.

The second reason is that the total number of voids is small. As a method for producing a preform, a method which bundles silica tubes and a method which forms a hole in a preform using a piercing instrument. Whichever method is adopted, since the number of voids can be reduced, the cumbersomeness at the time of fabricating the optical fiber can be reduced.

What is claimed is:

1. An optical fiber including a core region and cladding regions of not less than three layers which surround said core region in order, wherein the optical fiber is a single mode optical fiber; and each of said cladding regions has a mean refractive index different from those of the adjacent regions, at least one of said cladding regions has a lower mean refractive index than both adjacent cladding regions, and at least one cladding region is provided with a plurality of sub medium regions each having a refractive index lower than a main medium constituting this cladding region, wherein said core region is constituted by a substantially homogeneous medium and said cladding regions are constituted by an inner cladding region of not less than two layers made of a substantially homogeneous medium and an outer cladding region surrounding said inner cladding region is provided with said sub medium regions, and wherein said inner cladding region has a two layer structure consisting of a first inner cladding region and a second inner cladding region and a following relationship holds among respective refractive indexes $n_0$, $n_1$, $n_2$ of said core region, and said first inner cladding region, said second inner cladding region and a mean refractive index $n_3$ of said outer cladding region:

$$n_0 > n_2 > n_1 > n_3.$$

2. An optical fiber according to claim 1, wherein said sub medium regions in said outer cladding region are arranged as having a four-fold rotational symmentry.

3. An optical fiber according claim 1, wherein said main medium of said outer cladding region is made of silica and said sub mediums are gaseous or vacuum.

4. An optical fiber according to claim 3, wherein the relative mean refractive index difference of said core region to said outer cladding region is set to not less than 2%.

5. An optical fiber according to claim 3, wherein the relative mean refractive index difference of said first inner cladding region to said second inner cladding region is set to not more than –0.1%.

6. An optical fiber according to claim 1, wherein said optical fiber is operated in a single mode at a given wavelength between 1510 nm to 1590 nm.

7. An optical fiber according to claim 1, wherein the chromatic dispersion at a given wavelength between 1510 nm and 1590 nm is set to a value below –80 ps/mn/km.

8. An optical transmission path including said optical fiber according to claim 7 and an optical fiber having a positive chromatic dispersion at said given wavelength.

9. An optical fiber according to claim 3, wherein the ratio of the optical power which propagates through said sub mediums of said outer cladding region to the total optical power propagating through said optical fiber is set to not more than 1%.

* * * * *